US011364962B2

(12) United States Patent
Von Krauland (10) Patent No.: US 11,364,962 B2
(45) Date of Patent: Jun. 21, 2022

(54) METHOD AND PRODUCTION FACILITY FOR PRODUCING VEHICLES, AND SURFACE TREATMENT SYSTEM FOR TREATING THE SURFACE OF VEHICLE BODIES

(71) Applicant: EISENMANN SE, Böblingen (DE)

(72) Inventor: Matthias Von Krauland, Gstaad (CH)

(73) Assignee: EISENMANN GMBH, Böblingen (DE)

( * ) Notice: Subject to any disclaimer, the term of this patent is extended or adjusted under 35 U.S.C. 154(b) by 0 days.

(21) Appl. No.: 16/624,457

(22) PCT Filed: Jun. 12, 2018

(86) PCT No.: PCT/EP2018/065528
§ 371 (c)(1),
(2) Date: Mar. 16, 2020

(87) PCT Pub. No.: WO2018/234105
PCT Pub. Date: Dec. 27, 2018

(65) Prior Publication Data
US 2020/0216130 A1 Jul. 9, 2020

(30) Foreign Application Priority Data
Jun. 19, 2017 (DE) .................... 10 2017 113 343.7

(51) Int. Cl.
*B62D 65/18* (2006.01)
*B65G 17/00* (2006.01)
*B65G 35/06* (2006.01)

(52) U.S. Cl.
CPC ........... *B62D 65/18* (2013.01); *B65G 17/005* (2013.01); *B65G 35/06* (2013.01); *B65G 2201/0294* (2013.01)

(58) Field of Classification Search
CPC ...... B62D 65/18; B65G 17/005; B65G 35/06; B65G 2201/0294; F26B 15/16; F26B 25/003; F26B 2210/12; B05C 9/14
(Continued)

(56) References Cited

U.S. PATENT DOCUMENTS 5,743,962 A * 4/1998 Ogasawara ......... B05B 13/0221
118/643
6,966,431 B2 * 11/2005 Jaynes .................... B61B 10/02
198/465.4
(Continued)

FOREIGN PATENT DOCUMENTS

DE 10 2010 045 010 A1 3/2012
DE 20 2015 100 782 U1 5/2016
(Continued)

OTHER PUBLICATIONS

Clever Autonomy for Mobile Robots—KUKA Navigation Solution, Published on YouTube May 26, 2016, accessible at https://www.youtube.com/watch?v=kN9a7W_hnSQ.
(Continued)

*Primary Examiner* — James R Bidwell
(74) *Attorney, Agent, or Firm* — Schroeder Intellectual Property Law Group, LLC (57) ABSTRACT

A method for producing vehicles, in which vehicle bodies are conveyed through multiple treatment devices in order to carry out multiple work steps. In two successive work steps, work processes of different types are carried out on the vehicle bodies. The vehicle bodies are conveyed at least from a corrosion protection treatment process to a final assembly process in a surface treatment system for treating the surface of the vehicle bodies at least along some regions by a driverless transport system that has a plurality of floor-bound transport carriages which travel on a travel floor and each of which carries a dedicated drive system and is
(Continued)

driven and moved independently of one another. Furthermore, a surface treatment system is provided for treating the surface of vehicle bodies using multiple treatment devices, wherein a driverless transport system is provided that includes a plurality of floor-bound transport carriages, on each of which a respective vehicle body is secured and which travel on a travel floor, and each transport carriage carries a dedicated drive system and can be driven and moved independently of one another.

18 Claims, 6 Drawing Sheets

(58) Field of Classification Search
USPC .................................... 198/465.2, 357, 358
See application file for complete search history.

(56) References Cited

U.S. PATENT DOCUMENTS

| | | |
|---|---|---|
| 7,097,024 B2 | 8/2006 | Swoboda |
| 8,336,701 B2 | 12/2012 | Ruggaber et al. |
| 8,474,594 B2 | 7/2013 | Robbin et al. |
| 9,688,478 B2 | 6/2017 | Robbin |
| 10,359,234 B2 | 7/2019 | Robbin |
| 2007/0245922 A1 | 10/2007 | Ueno et al. |
| 2011/0099788 A1 | 5/2011 | Kilibarda |
| 2014/0083819 A1* | 3/2014 | Robbin ............... B65B 35/24 198/469.1 |
| 2016/0266578 A1* | 9/2016 | Douglas ............ G05D 1/0225 |
| 2018/0120028 A1 | 5/2018 | Robbin |
| 2018/0354083 A1* | 12/2018 | Thorwarth ......... B23P 21/004 |
| 2019/0233037 A1* | 8/2019 | Riegraf ................ F26B 25/02 |
| 2020/0130115 A1* | 4/2020 | Vetter ................ B23P 21/004 |

FOREIGN PATENT DOCUMENTS

| | | |
|---|---|---|
| EP | 1 336 553 B1 | 8/2003 |
| EP | 2 335 997 A1 | 6/2011 |
| EP | 2 322 414 B1 | 11/2012 |
| EP | 2 839 886 A1 | 2/2015 |
| JP | H1-172078 A | 7/1989 |
| JP | H6-341762 A | 12/1994 |
| JP | 2012-121652 A | 6/2011 |
| WO | 2011/053681 A1 | 5/2011 |
| WO | 2013/069420 | 5/2013 |
| WO | 2013/069420 A1 | 5/2013 |
| WO | 2016/180516 | 4/2016 |
| WO | 2016/180516 A1 | 11/2016 |
| WO | 2017/089224 | 6/2017 |

OTHER PUBLICATIONS

Weiss GMBH Transportation by Mecanum Wheel Drive, published on YouTube Sep. 14, 2011, accessible at https://youtube.com/watch?v=FeVghhvw9dQ.

* cited by examiner

METHOD AND PRODUCTION FACILITY FOR PRODUCING VEHICLES, AND SURFACE TREATMENT SYSTEM FOR TREATING THE SURFACE OF VEHICLE BODIES

RELATED APPLICATIONS

This application is a national phase of International Patent Application No. PCT/EP2018/065528 filed Jun. 12, 2018, which claims priority to German Patent Application No. 10 2017 113 343.7 filed Jun. 19, 2017—the contents of both of which are incorporated herein by reference.

FIELD OF THE INVENTION

The invention relates to a method for the manufacturing of vehicles, in which vehicle bodies are conveyed through a plurality of treatment installations for performing a plurality of work steps, wherein work of a different kind is performed on the vehicle bodies in two successive work steps.

The invention also relates to a surface treatment plant for the surface treatment of vehicle bodies with a plurality of treatment installations.

In addition, the invention relates to a production plant for the manufacturing of vehicles with a surface treatment plant.

BACKGROUND OF THE INVENTION

After vehicle bodies have been assembled from individual parts in a body-in-white plant and have received a corrosion protection in a corrosion protection plant, in particular by means of a cataphoretic dip coating, they are subjected to a surface treatment in a surface treatment plant before reaching a final assembly plant, wherein the surface treatment comprises a relatively large number of individual treatment steps and usually begins with the drying of the cataphoretic dip coating. In the body-in-white plant, work is thus performed on pre-stages of the vehicle body, namely on the individual phases during assembly of the vehicle body, while in the final assembly plant work is performed on subsequent stages of the vehicle body, namely on the individual phases during assembly of components and parts in and on the completed vehicle body. In the case at hand, both such pre-stages of the vehicle body and such subsequent stages of the vehicle body are included in the term vehicle body. With regard to the body-in-white, the first sheet metal part and all intermediate body structures up to the final vehicle body can thus be understood as vehicle body.

As a result, many different work steps are performed in a plant for the manufacturing of vehicle bodies, wherein the vehicle bodies have to pass through the work steps in a certain sequence and different types of work are performed on the vehicle bodies in the work steps. Such work includes measures in which the vehicle body is actively acted upon or modifies or supplements the same, such as in the assembly of individual parts in the body-in-white or in the final assembly, in the application of materials or the drying of the vehicle bodies, as well as measures in which no active acting upon the vehicle body occurs, such as an audit or a flash-off of the vehicle body. In the surface treatment plant, the vehicle bodies are treated in different ways in the different plant zones in the scope of such work.

For all work steps there are work installations with or in which the corresponding work is performed. In the surface treatment plant, such work installations are configured accordingly as treatment installations.

In a body-in-white plant, for example, sheet metal parts are connected to one another in different work steps in a different fashion.

In a cataphoretic dip treatment for corrosion protection in the corrosion protection plant, only one work step can be performed. The treatment for corrosion protection usually comprises in total several steps, even if a cataphoretic dip treatment is performed for corrosion protection. Further such work steps are, for example, pre-treatments, which can also be performed by dip methods. Depending on the techniques, which are chosen for the application of corrosion protection and which are not drip treatment or sole dip treatment, several work steps may also be necessary.

The various work steps in the surface treatment plant can essentially be subdivided into application steps, tempering steps and function steps, wherein one or more treatment installations can be necessary and provided for the individual work steps in the surface treatment plant.

In the application steps, the vehicle bodies are provided with a coating or a material. These include, for example, the application of filler, base coat or top coat, or the application of material for underbody protection or of material for seam sealing and insulation material.

In the tempering steps, the vehicle bodies are tempered. The term "tempering" of a vehicle body means bringing about a certain temperature of the vehicle body that it does not yet have. It can be an increase in temperature or a reduction in temperature. The flash-off of a vehicle body also counts as a treatment within the scope of a "tempering".

In the function steps, measures are taken which support the overall process and the overall sequence. This includes, for example, performing audits and, if necessary, reworking surface areas of the vehicle body that do not meet the required quality standard. Another function step is, for example, the measure of intermediate storing and/or holding available vehicle bodies in a storage installation.

In a final assembly plant, various work steps are performed, which are necessary for the assembly of the vehicle after the surface treatment of the vehicle body.

In production plants known from the market for the manufacturing of vehicles, and in particular in surface treatment plants belonging to such plants, the vehicle bodies are conveyed in various work steps with track-bound conveyor systems, in which the vehicle bodies are conveyed through the plant, lined up as if on a pearl necklace, in a largely unchangeable sequence. With such track-bound conveyor systems, a change in the specified sequence and in the treatment process is only possible, if at all, if transfer devices are present. In doing so, corresponding secondary routes must be made available, which means that the construction effort and the associated costs are very high. Such different conveyor systems, which can be used in the various work or treatment installations, are, for example, chain conveyors, roller conveyors with or without transversely displaceable carriages and turntables as well as overhead conveyors. The vehicle bodies can thereby occasionally be mounted on so-called skids, as they are known in and of themselves.

SUMMARY OF THE INVENTION

It is the object of the invention to provide a method, a surface treatment plant and a production plant of the type mentioned above, which take these thoughts into account.

This object is solved in a method of the type mentioned at the beginning in that the vehicle bodies are conveyed at least from a corrosion protection treatment to a final assembly in a surface treatment plant for the surface treatment of the vehicle bodies at least region-wise with a driverless transport system, which comprises a plurality of floor-bound transport carriages, which travel on a travel floor and which each carry their own drive system with them and are driven and moved independently of one another.

According to the invention, it was recognized that it is possible to achieve coordination of the treatment installations with a driverless conveyor system at least in a surface treatment plant, by means of which the vehicle bodies can be conveyed highly flexibly and independently of each other, so that a short-term change in the production process or in the individual manufacturing process of an individual vehicle is also possible.

It is particularly effective if the vehicle bodies are conveyed by means of the driverless transport system during all work steps performed in the surface treatment plant.

It is of great advantage for the entire plant if vehicle bodies are conveyed in a body-in-white plant and/or in a corrosion protection plant and/or in an assembly plant with the same driverless conveyor system as in the surface treatment plant.

In contrast to known plants, a production plant is thus operated, in which ideally for all work and treatment techniques a coordination of the individual work or treatment installations with the driverless conveyor system is realized. Even if, for example, one and the same conveyor system can be used in the body-in-white plant and in the surface treatment plant, but not in the corrosion protection plant, a considerable advantage is achieved in that the conveyor systems in the body-in-white and surface treatment do not have to be configured differently.

It is particularly advantageous if transport carriages are used, which comprise a transport carriage chassis and a fastening installation for at least one vehicle body, which are coupled to one another by means of a connection installation.

Such a conveyor system can be used particularly well if the vehicle bodies, for performing at least one work step, are conveyed through at least one treatment installation, which comprises a housing, in which a treatment tunnel is located, and which comprises a travel space, which is separate from the treatment tunnel, for the transport carriage chassis, wherein the treatment tunnel and the travel space are connected to one another by a connection passage such that the transport carriage chassis is moved in the travel space, wherein the fastening installation is carried along in the treatment tunnel and the connection installation extends through the connection passage. In this way, a separation of the treatment area from the conveying area is effected. Depending on the type of treatment, such a separation is not necessary. If necessary, separation can only occur by a corresponding floor, without the area above this floor having to be bounded by its own side walls or a ceiling.

Preferably, at least one treatment installation is used, which comprises a tunnel floor with the connection passage and in which the driving space is arranged below the treatment tunnel.

Alternatively or as a supplement, at least one treatment installation is advantageously used, in which a travel space housing is arranged in the treatment tunnel, wherein the travel space housing bounds the travel space at least region-wise within the treatment tunnel and comprises the connection passage.

In addition, alternatively or as a supplement, at least one treatment installation can be used, in which the travel space housing provides a thermal insulation installation. This is particularly advantageous if the treatment installation is a dryer.

It is particularly advantageous if transport carriages are used, which have an omnidirectional drive system, with which the transport carriages can travel in any direction from a standstill.

With such an omnidirectional drive, the transport carriages can be turned or turned around on the spot, for example. Furthermore, it is possible to move the vehicles sideways without cornering. This allows them to be removed from a line in a space-saving manner in order to travel to a specific work or treatment installation or to allow following transport carriages to overtake. Conversely, the transport carriages can also be controlled such that a first transport carriage overtakes a second transport carriage while the second transport carriage is in a work or treatment installation.

The above mentioned object is solved in a surface treatment plant of the type mentioned at the beginning in that a driverless transport system is provided, which comprises a plurality of floor-bound transport carriages, to each of which a vehicle body can be fastened and which travel on a travel floor, wherein the transport carriages each carry their own drive system with them and can be driven and moved independently of one another.

The advantages thereby achieved correspond to those explained above for the method.

Preferably, each transport carriage comprises a transport carriage chassis and a fastening installation for at least one vehicle body, which are coupled to one another by means of a connection installation.

Accordingly, it is advantageous if vehicle bodies, for performing at least one work step, can be conveyed by means of the conveying system through at least one treatment installation, wherein the treatment installation comprises a housing, in which a treatment tunnel is arranged, and which comprises a travel space, which is separate from the treatment tunnel, for the transport carriage chassis, wherein the treatment tunnel and the travel space are connected to one another by a connection passage such that the transport carriage chassis can be moved in the travel space, wherein the fastening installation is carried along in the treatment tunnel and the connection installation extends through the connection passage.

Depending on the work step to be performed, it can be advantageous that at least one treatment installation comprises a tunnel floor with the connection passage, wherein the travel space is arranged below the treatment tunnel.

Alternatively or as a supplement, it can be advantageous that for at least one treatment installation, a travel space housing is arranged in the treatment tunnel, wherein the travel space housing bounds the travel space at least region-wise within the treatment tunnel and comprises the connection passage.

Also as an alternative or a supplement, for at least one treatment installation the travel space housing can also provide a thermal insulation installation.

As explained above, it is advantageous if the transport carriages have an omnidirectional drive system, with which the transport carriages can travel in any direction from a standstill.

The object mentioned above is solved in a production plant of the type mentioned at the beginning in that the surface treatment plant is a surface treatment plant with some or all of the above features. The advantages correspond to the advantages explained in connection with the method and the surface treatment plant.

In corresponding fashion, it can be advantageous if the same conveyor system for the vehicle bodies as in the surface treatment system is present in the corrosion protection plant.

In addition, if there is a body-in-white plant and/or a corrosion protection plant and/or a final assembly plant, it is advantageous if there the same driverless conveyor system for the vehicle bodies is present as in the surface treatment plant.

BRIEF DESCRIPTION OF THE DRAWINGS

In the following, embodiments of the invention are explained in more detail based on the drawings.

DETAILED DESCRIPTION OF THE INVENTION

Figure 1:
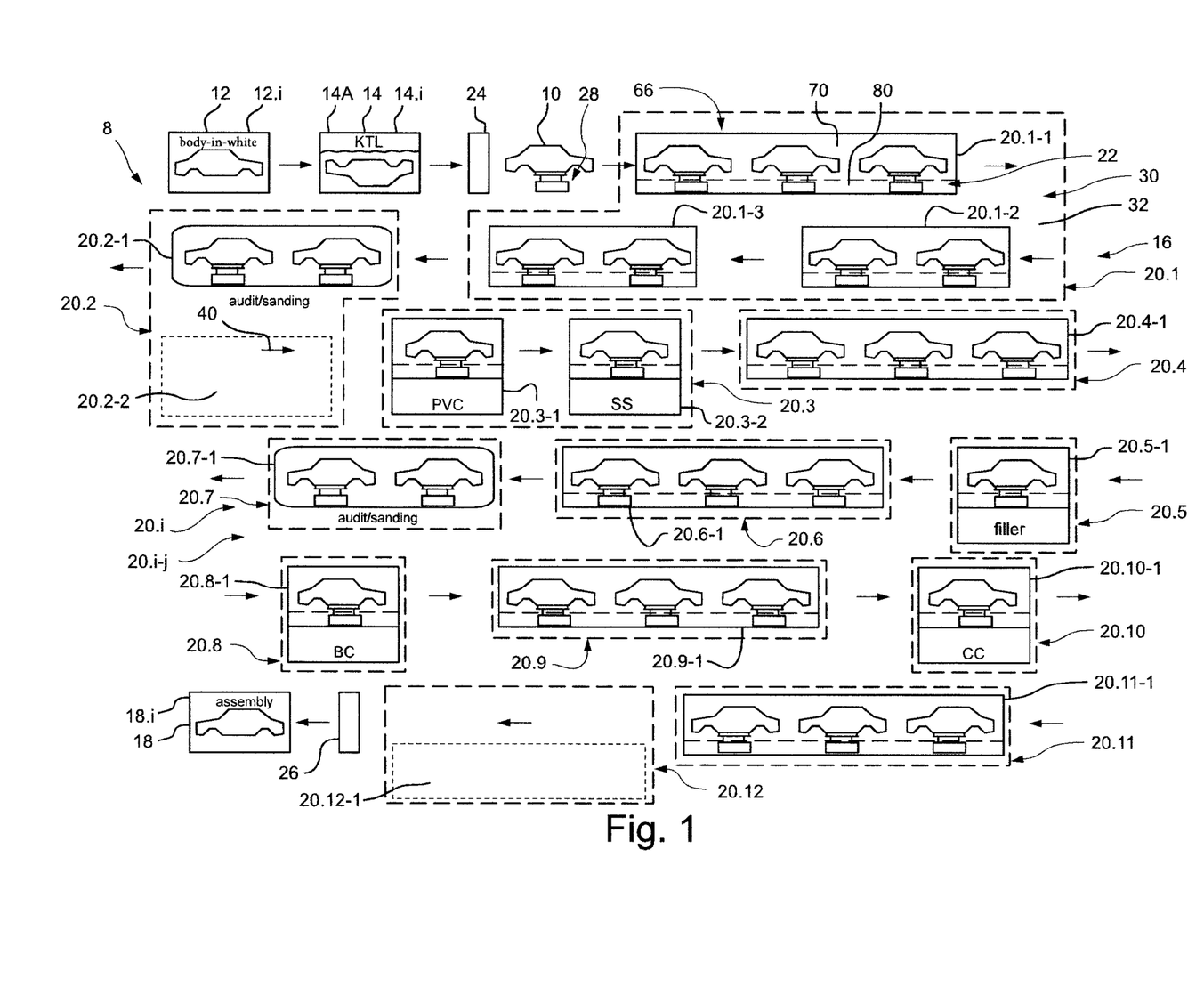
FIG. 1 schematically shows the sequence of work steps in the manufacturing of motor vehicles, wherein in particular a surface treatment plant for vehicle bodies is illustrated, in which vehicle bodies are treated in several work steps of different functionality in different ways.

FIG. 1 illustrates schematically a production plant 8 for the manufacturing of objects, wherein here a plant 8 for the manufacturing of vehicle bodies 10 is shown. The plant 8 for its part comprises individual plants 12, 14, 16 and 18. After a body-in-white plant 12, the vehicle bodies 10 get into a corrosion protection plant 14 and subsequently pass through a surface treatment plant 16. The vehicle bodies 10 then go into a final assembly plant 18, in which the operational motor vehicles are assembled. For the sake of clarity, only one of the vehicle bodies 10 bears a reference mark.

In the plants 12, 14, 16 and 18, different successive work steps can be performed, of which various work steps of the body-in-white plant 12, the corrosion protection plant 14 and the assembly plant 18 are indicated by the reference mark of the respective plant plus the index ".i", i.e. by 12.$i$, 14.$i$ and 18.$i$ respectively. Only the various work steps of the surface treatment plant 16 bear their own reference marks 20.$i$. The index ".i" is intended to indicate that i=1 to n work steps must be performed in each case, wherein n indicates the total number of work steps 12.$i$, 14.$i$, 18.$i$ and 20.$i$, respectively, in which the vehicle bodies 10 are treated in different ways. Consequently, if only one work step is required, n is equal to 1 in each case. If two work steps follow each other, they bear the indices "i" and "i+1".

In the body-in-white plant 12, sheet metal parts produced in a pressing plant are joined to the vehicle bodies 10. This can be done in different body-in-white steps 12.$i$ using different known techniques. Examples include spot welding, web welding, pressure joining, riveting and gluing. Consequently, here work is performed on a vehicle body 10.

In the corrosion protection plant 14, the vehicle bodies 10 are given a corrosion protection treatment. In the corrosion protection plant 14, individual corrosion protection steps 14.$i$ are performed; the corrosion protection plant 14 can be configured as a system for cataphoretic dip coating as known in and of itself. This is the case in the embodiment at hand, as schematically indicated in FIG. 1 by a CDC dipping bath 14A. However, other corrosion protection treatments can also occur, such as the application of corrosion protection by spraying or jetting or the like. Generally, at least one treatment plant for pre-treatment is included in the corrosion protection plant 14.

In the assembly plant 18, the vehicle bodies 10 are equipped with the necessary components and parts for an operational vehicle in work steps 18.$i$.

In the surface treatment plant 16, several different work steps 20.$i$ are performed, in which the vehicle bodies 10 are treated in different ways and which, in turn, may include several work processes. Different work steps 20.$i$ are framed by a dashed line in FIG. 1.

Thus, different successive steps 20.$i$ are marked with the reference mark 20 with a consecutive numerical index ".i", i.e. 20.1, 20.2, 20.3, etc. Treatment installations which are necessary for a work step 20.$i$ bear the reference mark of step 20.$i$ plus a numerical index "-j". If only one treatment installation is required for a work step 20.$i$, it therefore bears the reference mark 20.$i$–1; if there are several treatment installations for a work step 20.$i$, correspondingly there are treatment installations 20.$i$–1, 20.$i$–2, etc.

In the remaining plants 12, 14 and 18, work installations or treatment installations are present, which are not shown separately and marked with reference marks, for the associated work steps 12.$i$, 14.$i$ and 18.$i$.

The vehicle bodies 10 are treated in different ways in the surface treatment plant 16 in two work steps 20.$i$ and 20.$i$+1, which follow each other. This means that in the sequence of work steps 20.$i$ there are several work steps 20.$i$ in which the vehicle bodies 10 are treated in the same way. The distinction between two work steps 20.$i$ and 20.$i$+1 successive in sequence is here defined in that the type of treatment changes. In the sense of the classification explained above, the transition between application steps, tempering steps and function steps therefore leads to a change in the type of treatment.

In the embodiment at hand, the following steps 20.$i$ are performed in the surface treatment plant 16 in associated treatment installations 20.$i$-$j$ as an example:

20.1 first tempering step
    20.1-1 CDC dryer
    20.1-2 CDC cooling installation 20.1-3 CDC flash-off installation
20.2 first function step
  20.2-1 audit/sanding installation
  20.2-2 storage installation
20.3 first application step
  20.3-1 underbody protection (PVC) application installation
  20.3.2 seam sealing (SS) application Installation
20.4 second tempering step
  20.4-1 PVC dryer
20.5 second application step
  20.5-1 filler application installation
20.6 third tempering step
  20.6-1 filler dryer
20.7 second function step
  20.7-1 audit/sanding installation
20.8 third application step
  20.8-1 base coat (BC) painting installation
20.9 fourth tempering step
  20.9-1 BC dryer
20.10 fourth application step
  20.10-1 topcoat (CC) painting installation
20.11 fifth tempering step
  20.11-1 CC Dryer
20.12 third function step
  20.12-1 storage The vehicle bodies 10 are conveyed from one work step 20.$i$ to the next work step 20.$i$+1 and during the performance of the individual work steps 20.$i$, i.e. 20.1, 20.2, . . . , 20.$n$, with one and the same conveyor system 22, wherein n indicates the number of work steps to be performed. In the embodiment at hand, n=12. For this, the conveyor system 22 and the treatment installations 20.$i$-$j$ are coordinated with one another, as becomes clear further below.

Between the dipping bath 14A of the corrosion protection plant 14 and the first tempering step 20.1 there is a transfer installation 24, by means of which a vehicle body 10 to be treated can be transferred from the conveyor system of the corrosion protection plant 14 to the conveyor system 22 of the surface treatment plant 16. Correspondingly, between the third function step 20.12, i.e. the last work step in the surface treatment plant 16, and the final assembly plant 18, there is a transfer installation 26, by means of which a treated vehicle body 10 can be transferred from the conveyor system 22 of the surface treatment plant 16 to the conveyor system of the final assembly plant 18.

If the conveyor system in the corrosion protection plant 14 and/or the final assembly plant 18 is the same conveyor system 22 as in the surface treatment plant 16, the transfer installation 24 and/or the transfer installation 26 are not present. If the same conveyor system as in the corrosion protection plant 14 is not used in the body-in-white plant 12, as is the case if a CDC dipping bath 14A is present, a transfer installation not specifically shown here is present between these two plants.

Figure 7:
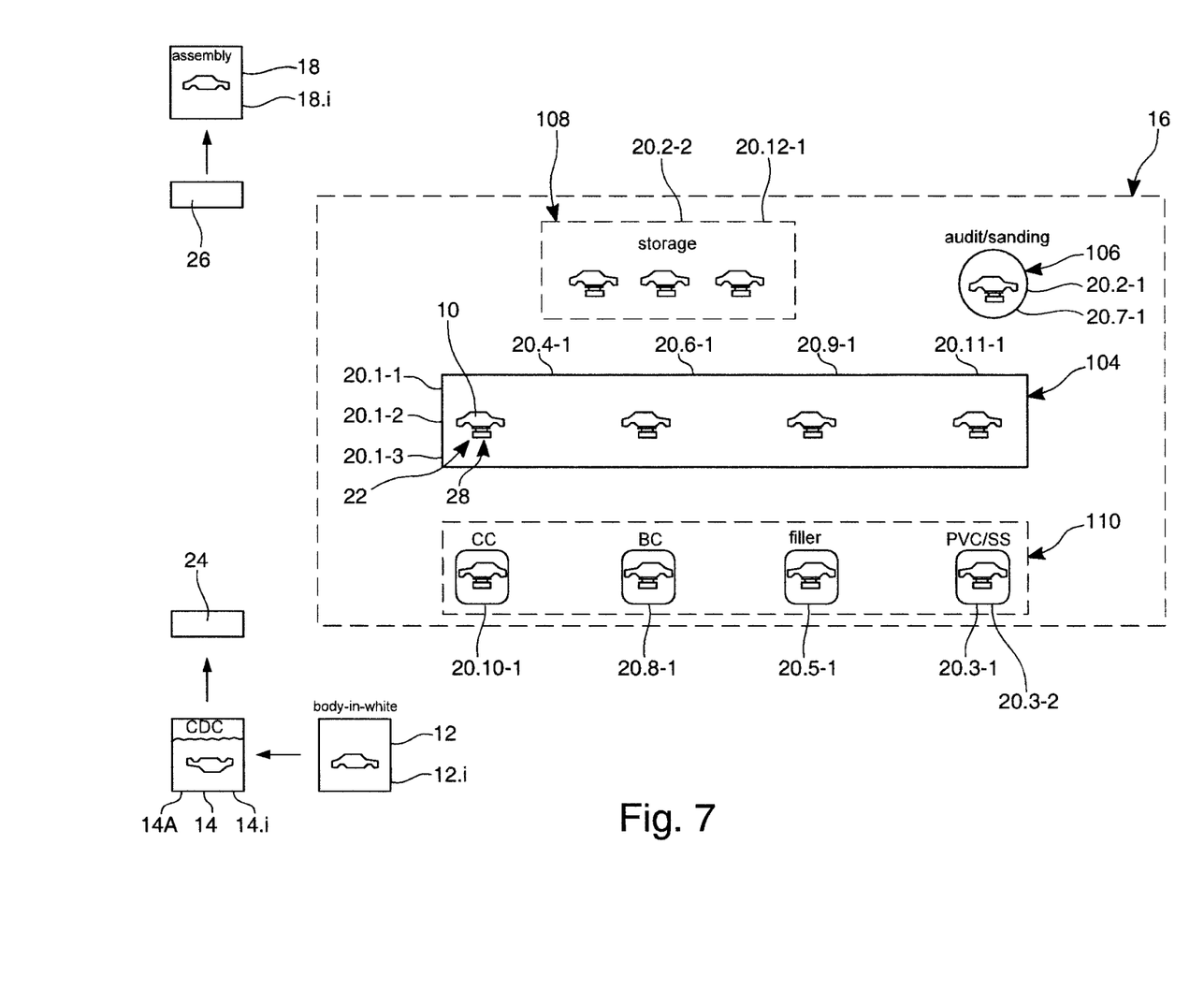
FIG. 7 schematically shows the layout of a plant for the manufacturing of motor vehicles, as is exemplarily possible due to the transport system according to FIGS. 2 and 3.

The transport system 22 is a driverless transport system with a plurality of floor-bound transport carriages 28, on which the vehicle bodies 10 are transported and of which only one transport carriage 28 bears a reference mark in FIGS. 1 and 7 respectively. The transport carriages 28 can travel on a travel floor 30. The handling and control of a driverless transport system is generally known in the Prior Art; in this sense, the plant 8 comprises a superordinate central control not specifically shown, installations for determining the location and position of the transport carriages 28, installations for data transmission as well as a suitable infrastructure which allows the transport carriages 28 to move.

It can also be possible for the vehicle bodies 10 to be conveyed during the cataphoretic dip treatment in the corrosion protection plant 14 and during the associated drying process, namely the first tempering step 20.1, with one and the same transport system, for example an overhead conveyor system, which is different from the driverless transport system 22. In this case, there is a transfer station between the first tempering step 20.1 and the first function step 20.2, which is not shown here.

Figure 2:
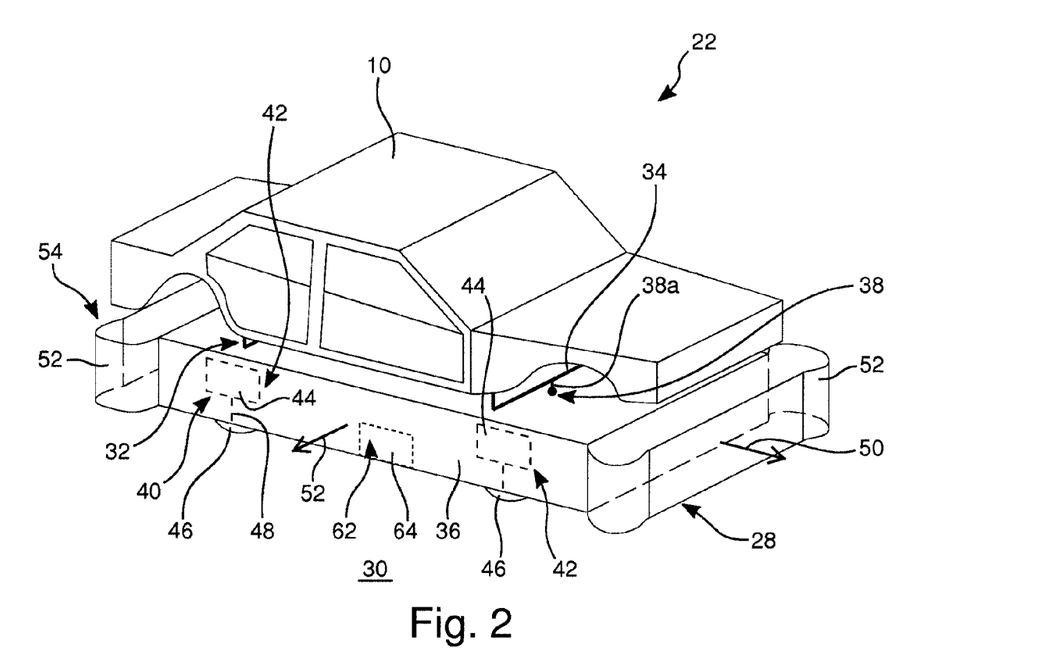
FIG. 2 shows a perspective view of a floor-bound transport carriage of a driverless transport system for vehicle bodies, in which a transport carriage chassis is connected to a fastening installation for workpieces via a connection installation.
Figure 3:
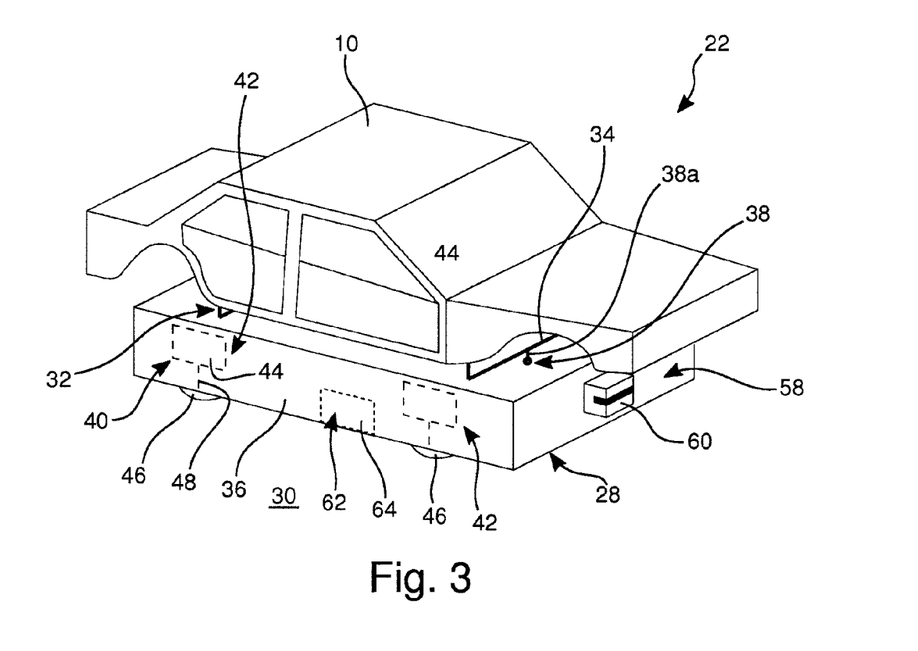
FIG. 3 shows a perspective view of a modified transport carriage of a driverless transport system for vehicle bodies with an ambient sensor system.

FIGS. 2 and 3 each show a single transport carriage 28 according to different safety concepts. Each transport carriage 28 comprises a fastening installation 32, to which a vehicle body 10 can be fastened. For this purpose, the fastening installation 32 comprises a support profile 34 with bearing bolts, which cooperate in a manner known in and of itself with counter elements on the vehicle body 10, so that the vehicle body 10 can be fixed to the fastening installation 32. The fastening installation 32 can also comprise several sets of such bearing bolts adapted to different vehicle bodies 10 of different dimensions and configurations so that the fastening installation 32 can be flexibly used for different vehicle body types.

The fastening installation 32 thus directly receives a vehicle body 10 without the vehicle body 10 being fastened to a workpiece carrier, such as, for instance, a skid known in and of itself. In the case of a modification not shown here, however, the fastening installation can also be configured to receive such a skid, which for its part then supports the vehicle body 10.

The transport carriage 28 comprises a transport carriage chassis 36, which runs on the floor 30 and supports the fastening installation 32. The transport carriage chassis 36 is coupled to the fastening installation 32 via a connection installation 38 in the form of two support struts 38$a$ projecting upwards. In FIGS. 2 and 3 only one support strut 38$a$ is visible.

Figure 5:
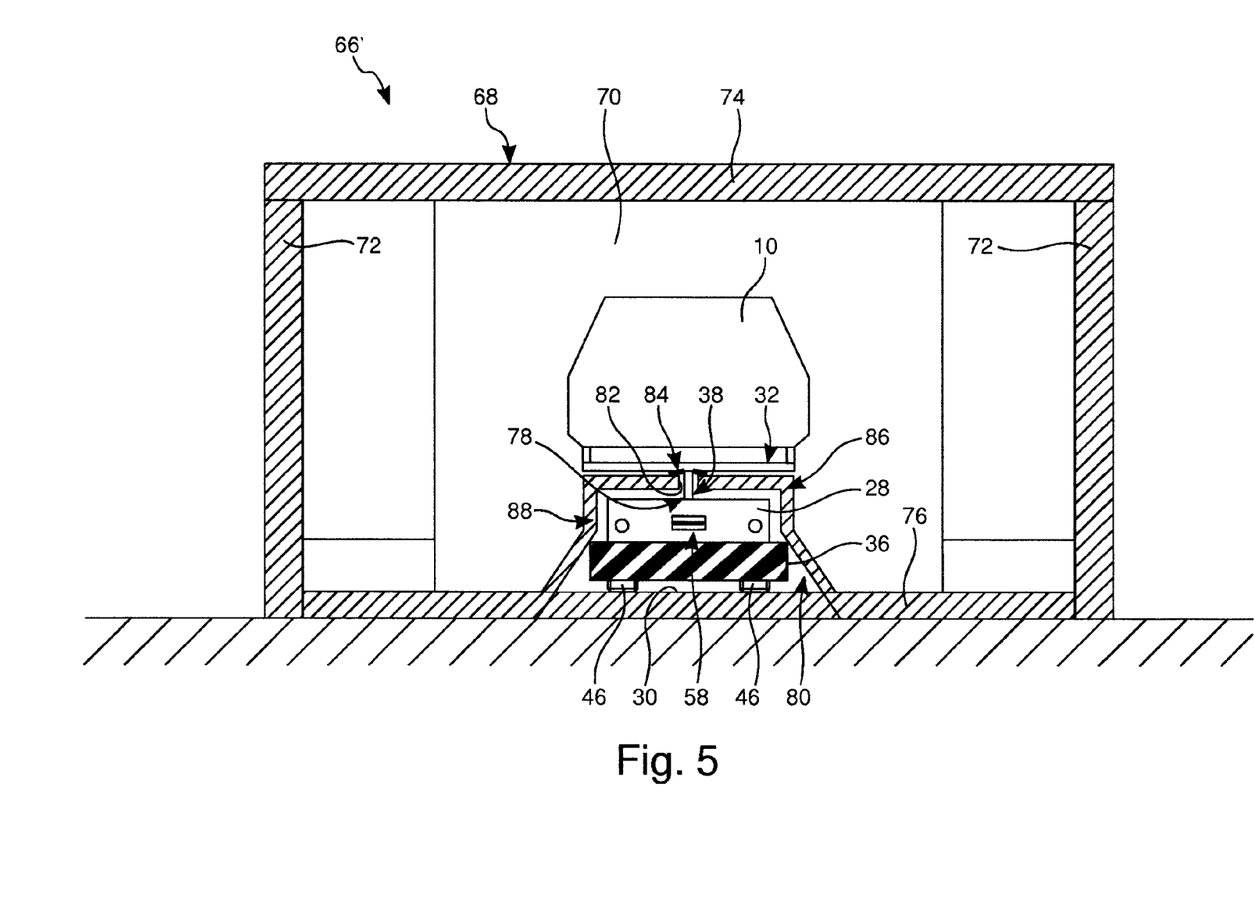
FIG. 5 shows a cross-section of a modified treatment installation with a travel space, which is integrated into the treatment tunnel, for the transport carriage chassis.
Figure 6:
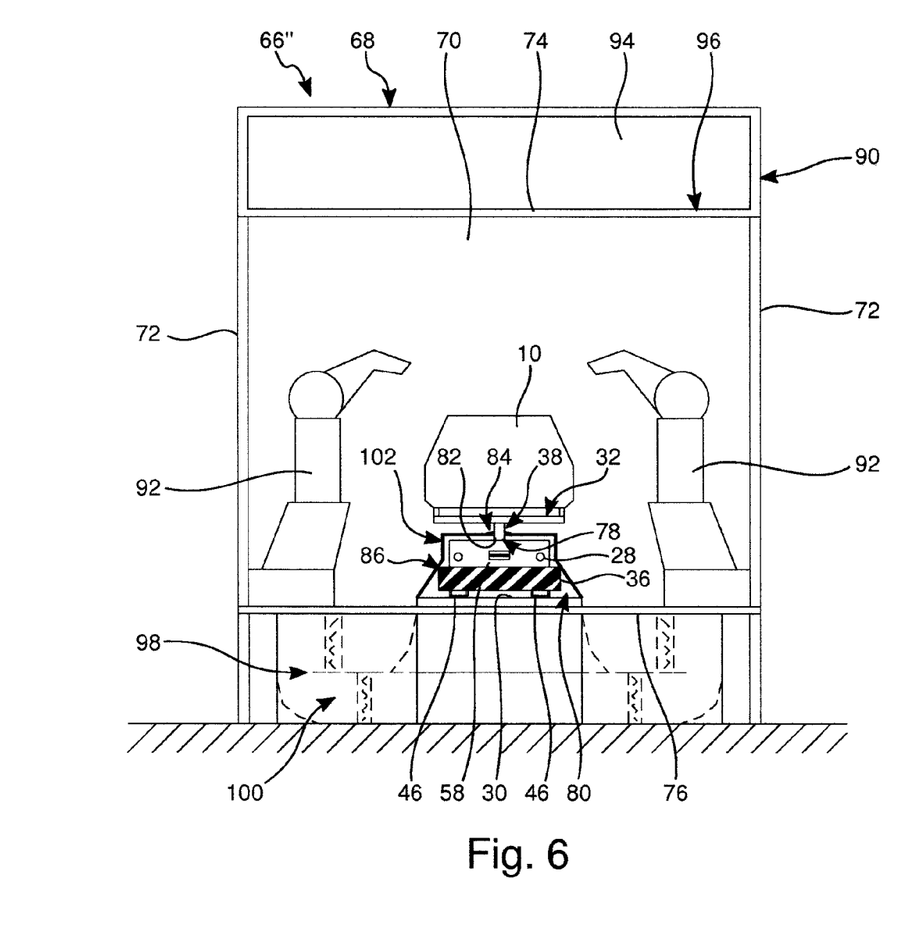
FIG. 6 shows a cross-section of a painting booth for an application step, wherein the painting booth cooperates with the transport system according to FIGS. 2 and 3, wherein a travel space, which is integrated into a painting tunnel, for the transport carriage chassis is provided.

FIGS. 5 and 6 illustrate that the transport carriage chassis 36 can be provided with a visually noticeable warning paint or adhesive.

Each transport carriage 28 carries its own drive system 40 along with itself, so that the transport carriages 28 can be driven and moved independently of each other.

The drive system 40 is omnidirectional, so that the transport carriages 28 can travel in any direction from a standstill. For this purpose, the omnidirectional drive system 40 comprises drive-turn modules 42 known per se. Alternatively, omniwheels or Mecanum wheels can also be present, as is known per se from Prior Art.

The drive-turn modules 42 comprise drive units 44, which are coupled to drive wheels 46, which protrude downwards, such that the drive wheels 46 cannot only be driven for propelling the transport carriage 28, but can also each be rotated about a vertical axis of rotation 48.

If the drive wheels 46 of all the drive-turn modules 42 are in the turn position shown in FIGS. 2 and 3 with respect to their vertical axis 48, then the transport carriage 28 moves along its longitudinal direction when the drive wheels 46 are turning, as indicated by an arrow 50 in FIG. 2. If the drive wheels 46 are all rotated by 90° with respect to their vertical axis 48, then the transport carriage 28 can travel perpendicularly to its longitudinal direction 50 from a standstill, i.e. without first cornering, as indicated by an arrow 52 in FIG. 2. By controlling the drive-turn modules 42 accordingly, rotations on the spot or diagonal traveling can also be realised. This allows them to be removed from a line in a space-saving manner in order to travel to a specific work step 20.*i* and manoeuvre in a confined space. For example, the transport carriages 28 can rotate by 180° in a treatment installation if certain treatment installations there are only provided on one side.

The transport carriage 28 shown in FIG. 2 comprises mechanical protection installations 54 in the front and in the rear in the direction of travel, configured as impact absorbers 56. In the event that a first transport carriage 28 collides with a second transport carriage 28 or any other obstacle, the impact is cushioned by the impact absorbers 56 and damage to both the transport carriage 28 and the vehicle body 10 supported by it is prevented.

The transport carriage 28 shown in FIG. 3 comprises an ambient sensor system 58 with sensors 60 mounted on the front and rear of the transport carriage chassis 36, in the direction of travel. With this ambient sensor system 58 obstacles in the travel path of the transport carriage 28 can be detected, be it other transport carriages 28 or other objects emerging in the movement field of the transport carriage 28, and transmitted to the central control mentioned above, which calculates an alternative route to the destination of the transport carriage 28 and transmits corresponding control commands to the transport carriage 28.

The transport carriages 28 carry a self-sufficient energy supply installation 62 with themselves for the energy supply. This is to be understood as an energy supply installation which ensures the energy supply of the drive-turn modules 42 and the other electrical consumers during travel operation, i.e. during movement of the transport carriage 28, independent of external energy sources.

In the embodiment at hand, the energy supply installation 62 with rechargeable energy storages 64 installation is configured for electrical energy, which can be provided in the form of an accumulator or capacitor. Alternatively, pressurised gas accumulators can be present as an energy source for pressurised gas drives.

Figure 4:
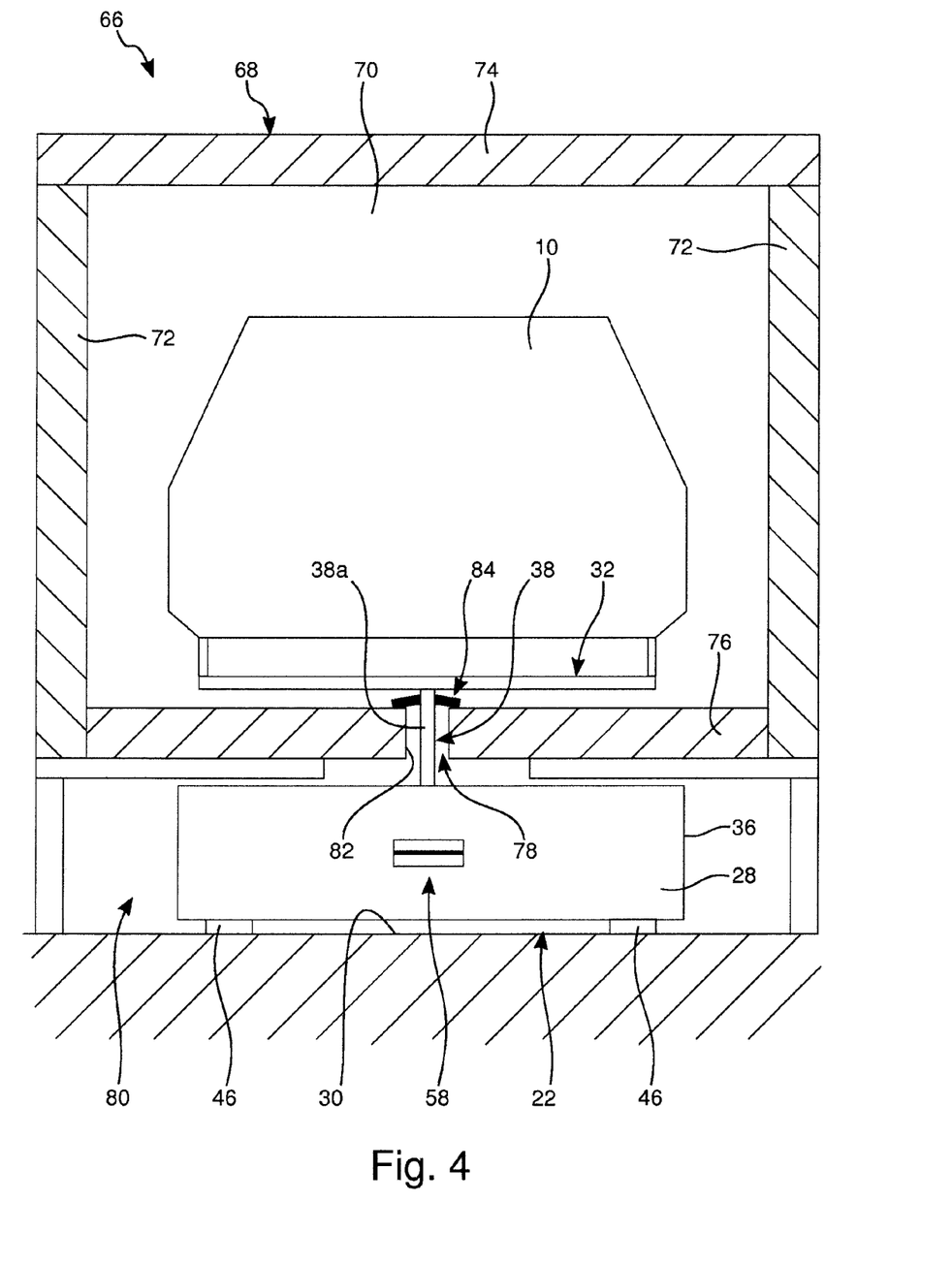
FIG. 4 shows a cross-section of a treatment installation for a work step, wherein the treatment installation cooperates with the transport system according to FIGS. 2 and 3, wherein a treatment tunnel is shown, the tunnel floor of which comprises a connection passage complementary to the connection installation, wherein the connection passage leads to a travel space for the transport carriage chassis, wherein the fastening installation is arranged in the treatment tunnel and the transport carriage chassis is arranged in the travel space.

Based on a treatment installation 66, FIG. 4 illustrates the basic concept of a work installation or treatment installation as used for individual work steps in plants 12, 14, 16, 18. The treatment installation 66 shows in particular a treatment installation 20.*i-j* as it can be provided for one of the tempering steps 20.1, 20.4, 20.6, 20.9, 20.11 or for one of the application steps 20.3, 20.5, 20.8, 20.10 in the surface treatment installation 16. The treatment installation 66 is thus an example of the treatment installations 20.*i-j* present in the embodiment at hand and of the work and treatment installations of the other plants 12, 14 and 18 not specifically shown.

The respective components of the treatment installation 78 explained below merely reflect the basic functionality of the component. For example, the housing of a dryer is configured in known fashion differently than, for example, the housing of a painting booth.

The treatment installation 66 comprises a housing 68, which bounds a treatment tunnel 70 and comprises side walls 72, a ceiling 74 and a tunnel floor 76. The tunnel floor 76 comprises a connection passage 78 complementary to the connection installation 38 of the transport carriages 28, wherein the connection passage 78 leads to a travel space 80, which is arranged below the treatment tunnel 70, for the transport carriage chassis 36.

FIG. 1 illustrates the separation of the treatment tunnel 70 from the travel space 80 for the treatment installations 20.*i-j*, which are functionally built like the treatment installation, illustrated by a dashed line; for the sake of clarity, only the treatment installation 66, the treatment tunnel 70 and the travel space 80 of the CDC dryer 20.1-1 are marked with reference marks. For the audit/sanding installations 20.2-1 and 20.7-1, no separation of a travel space and a treatment tunnel is shown as an example. This can always be dispensed with if there is no danger of the components and parts of the conveyor system 22 being affected negatively during treatment.

The travel space 80 can be open towards the surrounding area of the treatment installation 78; in any case the travel space 80 does not have to have its own housing.

FIG. 4 only shows support posts 84 to the side of the travel space 80, wherein the support posts 84 support the housing 68. In the case of a modification not specifically shown, the travel space 80, which runs below the treatment tunnel 70, is bounded by its own housing. Alternatively, the side walls 72 of the housing 68 can extend downwards beyond the tunnel floor 76, so that they bound the driving space 80 laterally.

When a transport carriage 28 loaded with a vehicle body 10 travels into a treatment installation 66, the connection installation 38 of the transport carriage 28 is thus quasi threaded into the connection passage 78 of the tunnel floor 76. When the vehicle body 10 is then conveyed through the treatment tunnel 70, the transport carriage chassis 36 moves in the travel space 80 and carries the fastening installation 32 along with it in the treatment tunnel 70, wherein the connection installation 38, i.e. in the embodiment at hand the support struts 38*a* and 38*b*, extends through the connection passage 78 in the tunnel floor 76.

As can be seen in FIG. 4, the connection passage in the embodiment at hand is configured as a vertical passage slot 82 to match the support struts 38*a*, 378. In this case, the tunnel atmosphere could flow largely unhindered from the treatment tunnel 70 through the connection passage 78 downwards into the travel space 80 at corresponding flow conditions without countermeasures.

In the case of a dryer, the tunnel atmosphere is loaded with solvent. In the case of a painting installation, the tunnel atmosphere carries in particular paint overspray, which could then deposit on the transport carriage chassis 36.

In order to prevent such an outflow of the tunnel atmosphere from the treatment tunnel 70, additional shielding means 84 are provided, by means of which contact of at least the transport carriage chassis 38 with the tunnel atmosphere through the connection passage 90 is at least reduced. Likewise, the flow of atmosphere from the travel space 92 into the treatment tunnel 82 can be reduced in order to maintain a stable atmosphere in the treatment tunnel 82. In a modification, the travel space 80 can also be subjected to a slight overpressure.

The travel floor 30 for the transport carriages 28 is arranged at a height level which is below the treatment tunnel 70 or below the tunnel floor 76 respectively in the case of the treatment installation 66 according to FIG. 4.

FIG. 5 shows a modified treatment installation 66', in which the travel floor 30 of the transport carriage 28 is arranged at the same height level as the treatment tunnel 70 or its tunnel floor 76 respectively. For this purpose, a travel space housing 86 is arranged in the treatment tunnel 70, wherein the travel space housing 86 bounds the travel space 80 within the treatment tunnel 70. In this case accordingly, it is not the tunnel floor 76, but rather the travel space housing 86 that comprises the connection passage 78, here in the form of the vertical passage slot 82. In particular, when the treatment installation 66' is a dryer, the travel space housing 86 is configured such that it provides a thermal insulation installation 88, by means of which the travel space 80 is thermally insulated from the treatment tunnel 70.

FIG. 6 shows a further modified treatment installation 66" in the example of a painting booth 90, in which application steps 20.3, 20.5, 20.6, 20.8 and/or 20.10 can be performed. In the treatment tunnel 70 of the painting booth 90, painting robots 92 are arranged, which are known in and of themselves. The ceiling 74 of the treatment tunnel 70 is usually configured as the lower boundary of an air feed space 94 with a filter ceiling 96. From the air feed space 94, cabin air enters the treatment tunnel 70 and absorbs overspray on its downward flow path before flowing over the permeable tunnel floor 74 into an area 98 below the treatment tunnel 70. In the area 98 there is a separation device 100, with the help of which overspray, which was swept along, is removed from the cabin air; this cleaned cabin air can then, if necessary after a predetermined conditioning, be guided back in a circuit to the air feed space 94. Such separation devices are known per se and therefore do not need to be explained further.

The travel space 80 is also bounded by the travel space housing 86 in the case of the spray booth 90, wherein the travel space housing 86 is located in the treatment tunnel 70. In the case of a spray booth 90, however, the travel space housing 86 does not have to be configured as a thermal insulation installation, but rather only provide a protective cover 102.

As mentioned above, the treatment installations 20.*i-j* are conceptually configured, like the treatment installations 66, 66' or 66", such that the connection installation 38 of the transport carriage 28 can cooperate with the tunnel floor 76 or the travel space housing 86 respectively and the respective shielding means 84 present there. The installations required for the respective treatment are present independent of this at the respective 20.*i-j* treatment installations. These are, for example, application, painting and/or handling robots in the application installations for the application steps or associated lighting installations in the audit/sanding installations, as well as the technology required for the operation of the treatment installations 20.*i-j*, for example in the form of technology for the air condition in painting booths.

By means of the driverless transport system 22 with the floor-mounted transport carriages 28, a vehicle body 10 fastened on a transport carriage 28 can be moved individually without its conveying path being dependent on the conveying paths of other vehicle bodies 10.

In plants known from the market with track-bound transport carriages, one or more separate treatment installations 20.*i-j* are present for each work step 20.*i* along the conveying path only for this work step 20.*i*. In such a plant, for each of the work steps 20.*i* illustrated in FIG. 1, corresponding spatial work zones of the surface treatment plant with one or more associated treatment installations 20.*i-j*, which must be passed through by the transport carriages 28 and the vehicle bodies 10 fastened thereto in the specified sequence, are thus defined.

The driverless transport system 22, on the other hand, enables the same treatment installation to be used for similar treatment steps 20.*i*, which must be performed at different times during the treatment process. In particular, this is possible for the tempering steps 20.1, 20.4, 20.6, 20.9, 20.11 and the function steps 20.2, 20.7 and 20.12. This is also possible for the application steps 20.3, 20.5, 20.8, 20.10.

This concept illustrates the plant layout according to FIG. 7. There, the surface treatment plant 16 comprises a single tempering device 104, in which the tempering steps 20.1, 20.4, 20.6, 20.9, 20.11 are performed. For this purpose, the tempering device 104 comprises corresponding temperature areas and a flash-off area.

The surface treatment plant 16 also comprises a single audit/sanding device 106 and a single storage device 108 for the work steps 20.2, 20.7 and 20.12.

A vehicle body 10 is now transferred after the CDC dipping bath 14A by means of the transfer installation 24 onto a transport carriage 28 of the transport system 22 and guided by means of this through the tempering device 104, which in this case serves as CDC dryer 20.1-1, as CDC cooling installation 20.1-2 and as CDC flash-off installation 20.1-2 for the first tempering step 20.1.

After this, the transport carriage 22 conveys the vehicle body 10 to the audit/sanding device 106, which then provides the audit/sanding installation 20.2-1 for the first function step 20.2. If in this step an intermediate storage of the vehicle body 10 occurs, then the storage device 108 serves as storage installation 20.2-2 for this function step 20.2.

Now the first application step 20.3 is performed in the underbody protection (PVC) application installation 20.3-1 and the seam sealing (SS) application installation 20.3-2.

To perform the second tempering step 20.4, the vehicle body 10 is again driven into the tempering device 104, which now serves as the PVC dryer 20.4-1.

Subsequently, in the second application step 20.5, the application of the filler occurs in the application installation 20.5-1.

Now, for the third tempering step 20.6, the vehicle body 10 is again conveyed into the tempering device 104, which now serves as filler dryer 20.6-1.

Then, for the second function step 20.7, the vehicle body 10 is put a second time into the audit/sanding device 106, which now operates as audit/sanding installation 20.7-1.

For the third application step 20.8, the vehicle body 10 is conveyed on the transport carriage 28 to the basecoat (BC) painting installation 20.8-1 and subsequently, for the fourth tempering step 20.9, is driven a fourth time into the tempering device 104, which in this case acts as the BC dryer 20.9-1.

The fourth application step 20.10 is now performed in the topcoat (CC) painting unit 20.10-1, whereupon the vehicle body 10 is guided a fifth time through the tempering device 104 for the fifth tempering step 20.11; this now fulfils the function of the CC dryer 20.11-1.

Before the vehicle body 10 is now transferred to the assembly plant 18 by means of the transfer installation 26, it can be intermediately stored a second time in the storage device 108 in the third function step 20.12, which in this case assumes the function of the storage 20.12-1.

In a modification, the application steps 20.3 (PVC/SS), 20.5 (filler), 20.8 (BC) and 20.10 (CC) are performed in a single multifunctional application device 110, which can be operated in a correspondingly flexible manner and which then correspondingly performs the functions of the application and painting installations 20.3-1, 20.3-2, 20.5-1, 20.8-1, and 20.10-1 and which is then correspondingly passed through several times by a vehicle body 10.

The multifunctional application device 110 is indicated in FIG. 7 by a dashed rectangle, which encloses the treatment installations 20.3-1, 20.3-2, 20.5-1, 20.8-1 and 20.10-1.

In a modification, the multifunctional application device 110 can house the individual application and painting installations 20.3-1, 20.3-2, 20.5-1, 20.8-1 and 20.10-1 in a common housing, which then can also be configured as a batch booth and not as a continuous booth. The individual application and painting installations 20.3-1, 20.3-2, 20.5-1,

20.8-1, and 20.10-1 can then be arranged along a conveying path, which leads past the application and painting installations 20.3-1, 20.3-2, 20.5-1, 20.8-1, and 20.10-1 and from which the transport carriages 22 then enter the required application and painting installation 20.3-1, 20.3-2, 20.5-1, 20.8-1, or 20.10-1.

In order to coordinate the process specific to a vehicle body 10, each vehicle body 10, for example, carries along a data memory, on which the product characteristics and the work steps to be performed are stored. This data can be read by the transport carriage 28, on which the vehicle body 10 is fastened, for which a corresponding data transfer/memory unit is carried by each transport carriage 28.

The transport carriage 28 can communicate directly with the respective treatment installation 20.$i$-$j$ to be approached for a specific work step 20.$i$. In the case of an application installation 20.$i$, the installation is supplied with the corresponding coating material on the basis of the data transmitted by the transport carriage 28; in addition, in the case of a painting booth 90, for example, the painting robots 92 receive their application program, which determines the movement sequence of the painting robots 92 and the application parameters for the application process.

The use of the driverless transport system 22 allows above all the integration of the plant systems and their control into the Industry 4.0 concept, in which industrial production processes are to be linked with modern information and communication technologies. The driverless transport system 22 permits a high degree of flexibility in the process sequence, even changes in the process for a specific vehicle body 10 or changes in the sequence of the treatments of different vehicle bodies 10 are possible due to the variability in the routing of the transport carriages 28.

The arrangement of the respective treatment installations 20.$i$-$j$ can occur largely arbitrary; the positioning of the treatment installations 20.$i$-$j$ in a plant can be adjusted in particular to their infrastructure in relation to the media required and offered in the plant such as paints, water, air and the like or to required plant parts such as components for the air condition or for a high-voltage generation and the like.

What is claimed is:

1. A method for the manufacturing of vehicles, comprising:
conveying vehicle bodies through a plurality of treatment installations for performing a plurality of work steps, wherein work of a different kind is performed on the vehicle bodies in two successive work steps,
wherein
the vehicle bodies are conveyed at least from a corrosion protection treatment to a final assembly in a surface treatment plant for the surface treatment of the vehicle bodies at least region-wise with a driverless transport system which comprises a plurality of floor-bound transport carriages which travel on a travel floor and which each carry their own drive system and are driven and moved independently of one another in a pathless manner, wherein any floor-bound transport carriage from the plurality of floor-bound transport carriages may overtake any floor-bound transport carriage which is positioned in any treatment installation from the plurality of treatment installations.

2. The method according to claim 1, wherein the vehicle bodies are conveyed by the driverless transport system during all work steps performed in the surface treatment plant.

3. The method according to claim 1, wherein vehicle bodies are conveyed in a body-in-white plant and/or in a corrosion protection plant and/or in an assembly plant with the same driverless conveyor system as in the surface treatment plant.

4. The method according to claim 1, wherein transport carriages are used, each transport carriage comprising a transport carriage chassis and a fastening installation for at least one vehicle body which are coupled to one another by a connection installation.

5. The method according to claim 4, wherein the vehicle bodies, for performing at least one work step, are conveyed through at least one treatment installation, the at least one treatment station comprising a housing in which a treatment tunnel is arranged, and which comprises a travel space which is separate from the treatment tunnel, for the transport carriage chassis, wherein the treatment tunnel and the travel space are connected to one another by a connection passage such that the transport carriage chassis is moved in the travel space, wherein the fastening installation is carried along in the treatment tunnel and the connection installation extends through the connection passage.

6. The method according to claim 5, wherein at least one treatment installation is used which comprises a tunnel floor with the connection passage and in which the travel space is arranged below the treatment tunnel.

7. The method according to claim 5, wherein at least one treatment installation is used in which a travel space housing is arranged in the treatment tunnel, wherein the travel space housing bounds the travel space at least region-wise within the treatment tunnel and comprises the connection passage.

8. The method according to claim 7, at least one treatment installation is used, in which the travel space housing provides a thermal insulation installation.

9. The method according to claim 1, wherein transport carriages are used, each transport carriage having an omnidirectional drive system, with which the transport carriages can travel in any direction from a standstill.

10. A surface treatment plant for the surface treatment of vehicle bodies with a plurality of treatment installations, comprising:
a driverless transport system comprising a plurality of floor-bound transport carriages to each of which a vehicle body can be fastened and which travel on a travel floor, wherein the transport carriages each carry their own drive system and can be driven and moved independently of one another in a pathless manner such that any floor-bound transport carriage from the plurality of floor-bound transport carriages may overtake any floor-bound transport carriage which is positioned in a treatment installation.

11. The surface treatment plant according to claim 10, wherein each transport carriage comprises a transport carriage chassis and a fastening installation for at least one vehicle body which are coupled to one another by means of a connection installation.

12. The surface treatment plant according to claim 11, wherein the vehicle bodies, for performing at least one work step, can be conveyed by the driverless transport system through at least one treatment installation, wherein the at least one treatment installation comprises a housing in which a treatment tunnel is arranged and a travel space which is separate from the treatment tunnel for the transport carriage chassis, wherein the treatment tunnel and the travel space are connected to one another by a connection passage such that the transport carriage chassis can be moved in the travel space, wherein the fastening installation is carried along in the treatment tunnel and the connection installation extends through the connection passage.

13. The surface treatment plant according to claim 12, wherein at least one treatment installation comprises a tunnel floor with the connection passage, wherein the travel space is arranged below the treatment tunnel.

14. The surface treatment plant according to claim 12, wherein for at least one treatment installation, a travel space housing is arranged in the treatment tunnel, wherein the travel space housing bounds the travel space at least region-wise within the treatment tunnel and comprises the connection passage.

15. The surface treatment plant according to claim 14, wherein for at least one treatment installation, the travel space housing provides a thermal insulation installation.

16. The surface treatment plant according to claim 10, wherein the transport carriages each have an omnidirectional drive system with which each transport carriage can travel in any direction from a standstill.

17. A production plant for the manufacturing of vehicles comprising: a surface treatment plant according to claim 10.

18. A production plant according to claim 17, wherein the same driverless conveyor system for the vehicle bodies as in the surface treatment plant is present in a body-in-white plant and/or in a corrosion protection plant and/or in a final assembly plant.

* * * * *